July 22, 1930.  C. C. CHAMPION, JR  1,771,074
INTERNAL COMBUSTION ENGINE
Filed Sept. 21, 1926   2 Sheets-Sheet 1
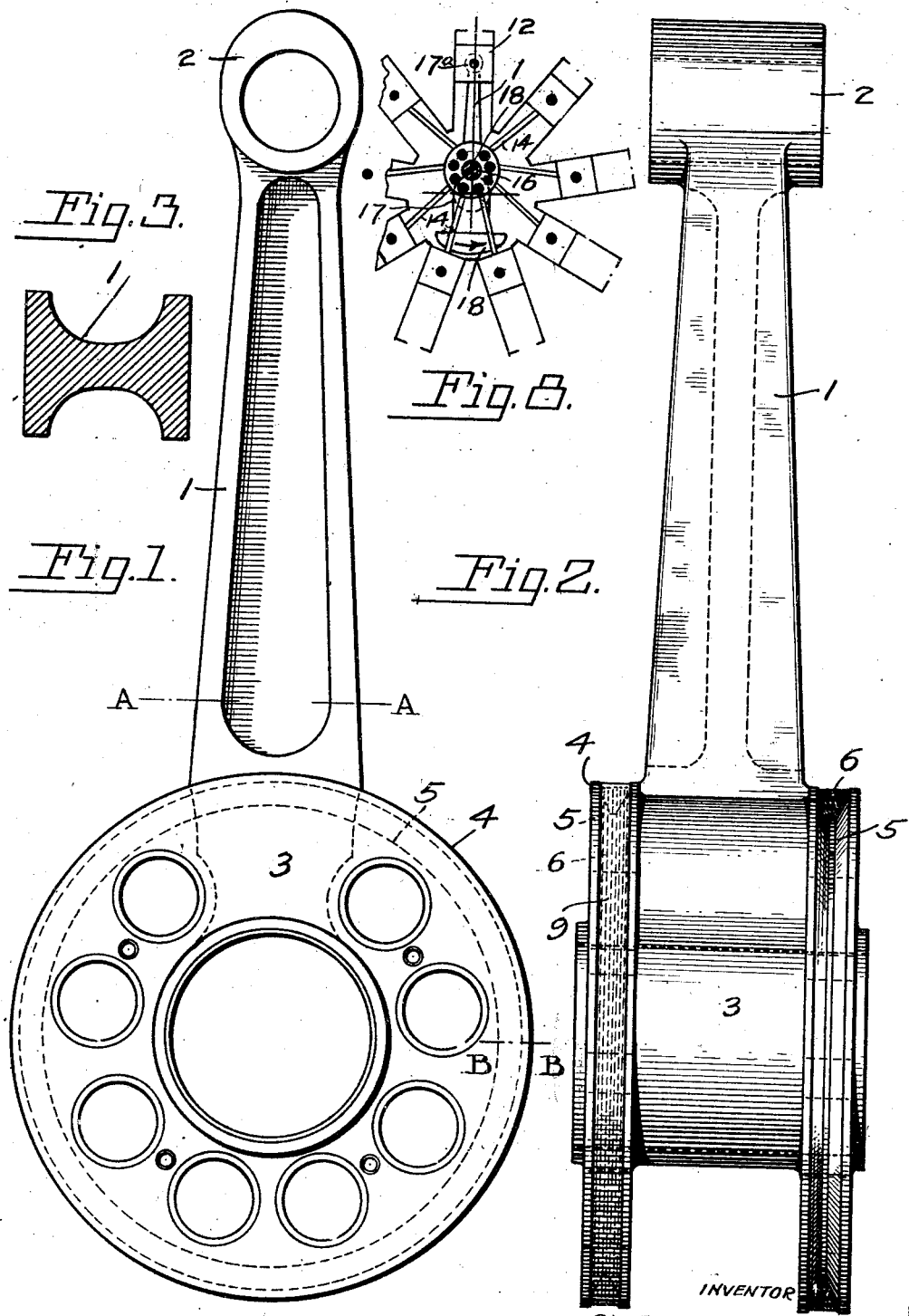

July 22, 1930.  C. C. CHAMPION, JR  1,771,074
INTERNAL COMBUSTION ENGINE
Filed Sept. 21, 1926  2 Sheets-Sheet 2
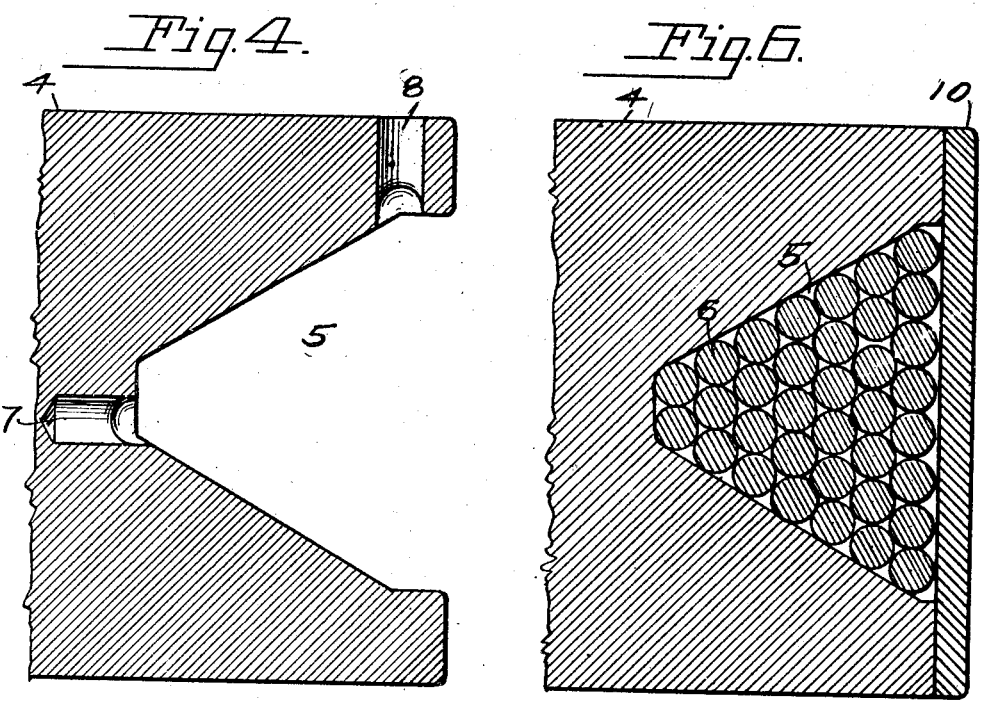
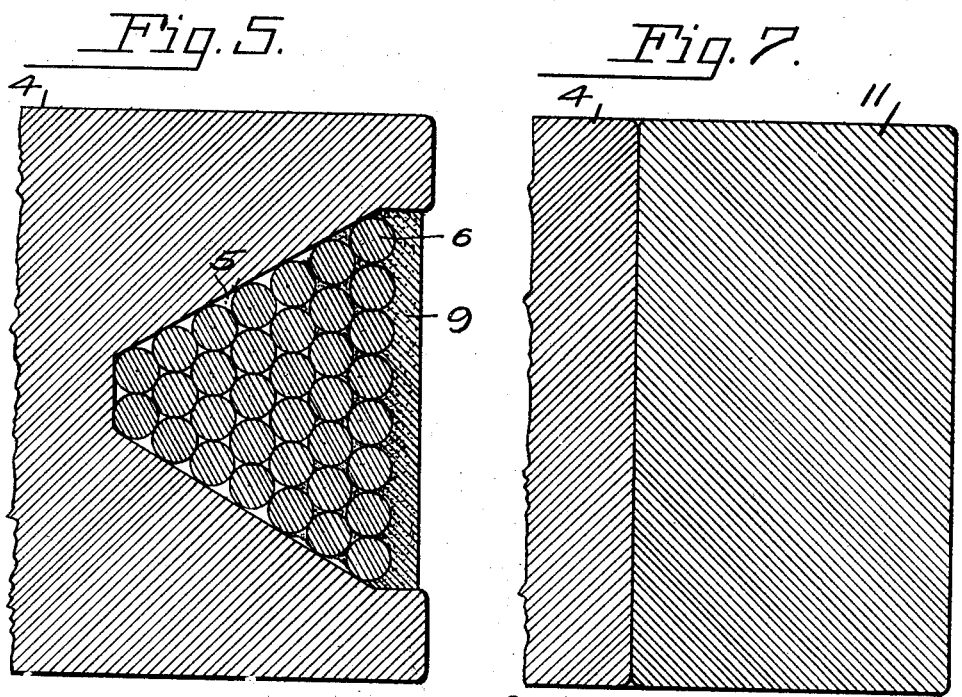
Carleton C. Champion, Jr., INVENTOR
BY
ATTORNEY Patented July 22, 1930

1,771,074

UNITED STATES PATENT OFFICE

CARLETON C. CHAMPION, JR., OF WASHINGTON, DISTRICT OF COLUMBIA

INTERNAL-COMBUSTION ENGINE

Application filed September 21, 1926. Serial No. 136,845.

My invention relates broadly to internal combustion engines and more particularly to connecting rods therein.

The principal object of my invention is to provide a master connecting rod of light alloy metal having a means for reinforcing the bearing portions, surrounding the crank shaft whereby the effect of tension load and stress reversals is minimized.

This is especially desirable in a radial engine in which the articulated type of connecting rod is employed, and in which all but one of the crank shaft ends of the connecting rod are pinned to the master connecting rod.

Another object of my invention is to place the material of the master connecting rod, that forms an anchorage for the crank shaft ends of the subsidiary rods, in an initially compressed state, thereby strengthening the same against the tension stresses imposed by the subsidiary rods due to inertia forces set up by the reciprocating masses of the corresponding piston assemblies.

With the above and other objects in view my invention consists in the construction, combination and arrangement of parts as will be hereinafter more fully described.

Reference is to be had to the accompanying drawings forming part of this specification in which like reference characters indicate corresponding parts throughout the several views, and in which:

Figure 1 is a front elevation of my improved master connecting rod,

Figure 2 is a side elevation, showing one of the reinforcing members in section, Figure 3 is a detail section on the line 3—3 of Figure 1, Figure 4 is an enlarged view on the line 4—4 of Figure 1 showing one type of securing means for the reinforcing means, Figure 5 is a similar view showing the reinforcing means in position, and a protective covering applied thereto, Figure 6 is a section showing a modified form of protective covering, Figure 7 is a section showing a modified form of the reinforcing means, and Figure 8 is a diagrammatic assembly of the master connecting rod and subsidiary connecting rods and their relative positions to the engine cylinders.

The means employed by me for reinforcing the light alloy material at the crank shaft end of the master connecting rod is a steel cable wound in a groove encircling that portion of the master connecting rod, or it may be circular steel bands pressed or shrunk thereon. If the cable is used, it is applied by wrapping under tension and firmly secured at both ends to prevent slipping, after which a protective covering is applied. Either means may be employed whether it is desired to design the master connecting rod in one piece as shown, or split in the customary manner, the only difference in the application being the necessity of assembling the connecting rod to the crank-shaft before the reinforcement is applied.

The improved construction will permit the design of a master connecting rod of light weight alloy metal of a lower tensile strength than steel, reducing its net weight approximately one-half the weight of one made of steel, and it will eliminate the necessity of the usual connecting rod bolts and bosses employed to hold the bearing cap in place. I provide a construction free from deformation or distortion because of the uniform distributed compressive force exerted by the circular reinforcing members about the periphery of the flanges of the bearing area.

Referring more particularly to the drawings, 1 indicates a master connecting rod of compressed light weight alloy metal, the shank of which has a cross section substantially the same as that illustrated in Figure 3. It is provided with a bearing 2 at its upper end for engagement with a piston pin and a lower portion 3 composed of circular flanges 4 providing a bearing surface for contact with the crank shaft and anchorages for the pins of subsidiary connecting rods. Each of the flanges is provided with a peripheral V-shaped groove 5 in which is wound under tension a steel reinforcing cable 6. The inner end of the cable is bent and secured in a recess 7 formed in the inner portion of the groove, the outer end passing through the aperture 8 extending through one leg of the flange and being firmly secured in any desired manner. To further secure the cable from slipping it is desirable to apply a covering 9, that in the form shown in Figure 5 is a coating of any preferred material applied by dipping, sweating or by a galvanic process.

It may be desirable in some instances to use other than a coating to aid in securing the cable within the groove, and such an arrangement I have illustrated in Figure 6, wherein a circular spring steel band 10 is secured to the flange in any desired manner to close the groove, thus securely holding the reinforcing cable therewithin.

In Figure 7 I have shown a modified form of reinforcing means, employing a steel band 11 that is pressed or shrunk, or otherwise secured to the periphery of the flange. This construction does not require that the flanges be grooved.

In Figure 8 I have shown an assembly of the master connecting rod, 1, with relation to the subsidiary connecting rods 14, at a point of the engine cycle where the master connecting rod 1 and the crank 16 of the engine shaft 17 are on dead center. The master connecting rod 1 is attached to the piston 12 at its upper end by a pin 17ª, and at its lower end is mounted on the crank 16 so as to permit free rotation of the engine crank 16. The counter balance for off-setting the eccentric loads of the rotating and oscillating parts of the connecting rod assembly is indicated at 18.

It will be understood that various changes in form, proportion and minor details of construction may be resorted to without departing from the principle or sacrificing any of the advantages of my invention as claimed.

Having described my invention what I claim is:

1. A connecting rod having a bearing at one end, flanges forming an integral bearing area at the other end, grooves formed in the flanges, and reinforcing means secured in the grooves.

2. A connecting rod having a bearing at one end, flanges forming an integral bearing area at the other end, grooves in the flanges, continuous reinforcing means in the grooves, and means for securing the reinforcing means therein.

3. A connecting rod having a bearing at one end, flanges forming an integral bearing area at the other end, grooves in the flanges, cables wrapped under tension in the grooves, the inner ends of which are secured in recesses in the grooves and the outer ends passed through apertures in the flanges, and covers for the grooves.

4. A connecting rod having a bearing at one end and flanges forming an integral bearing area at the other end, grooves in the flanges, reinforcing means in the grooves, and a protective coating applied to the reinforcing means.

5. A connecting rod of a light alloy metal having a bearing at one end and a bearing area at the other, and a continuous reinforcing means placing said area under compression, said reinforcing means being composed of wire of high tensile strength, and encircling the bearing area in juxtaposition to the crank shaft end.

CARLETON C. CHAMPION, Jr.